(12) United States Patent
Amthor et al.

(10) Patent No.: US 11,024,019 B2
(45) Date of Patent: Jun. 1, 2021

(54) IMAGE-BASED MAINTENANCE PREDICTION AND DETECTION OF OPERATING ERRORS

(71) Applicant: CARL ZEISS MICROSCOPY GMBH, Jena (DE)

(72) Inventors: Manuel Amthor, Jena (DE); Daniel Haase, Zöllnitz (DE); Ralf Wolleschensky, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 0 days.

(21) Appl. No.: 16/720,761

(22) Filed: Dec. 19, 2019

(65) Prior Publication Data

US 2020/0202508 A1 Jun. 25, 2020

(30) Foreign Application Priority Data

Dec. 20, 2018 (DE) ..................... 10 2018 133 196.7

(51) Int. Cl.
*G06T 7/00* (2017.01)
*G02B 21/36* (2006.01)
(52) U.S. Cl.
CPC .......... *G06T 7/0002* (2013.01); *G02B 21/365* (2013.01); *G06T 2207/10056* (2013.01); *G06T 2207/20081* (2013.01); *G06T 2207/20084* (2013.01); *G06T 2207/30168* (2013.01)
(58) Field of Classification Search
CPC ......... G06T 7/0002; G06T 2207/10056; G06T 2207/20081; G06T 2207/20084; G06T 2207/30168; G02B 21/365

USPC ........................................................... 348/79
See application file for complete search history.

(56) References Cited

U.S. PATENT DOCUMENTS

| | | | |
|---|---|---|---|
| 5,467,355 A | 11/1995 | Umeda et al. | |
| 9,291,450 B2 | 3/2016 | Takahashi | |
| 9,959,451 B2 | 5/2018 | Suenaga et al. | |
| 2007/0031043 A1* | 2/2007 | Perz ......................... | G06T 7/11 382/225 |

(Continued)

FOREIGN PATENT DOCUMENTS

| | | |
|---|---|---|
| DE | 3811791 A1 | 10/1988 |
| DE | 10161633 A1 | 8/2002 |
| DE | 10161655 A1 | 1/2003 |

(Continued)

OTHER PUBLICATIONS

Search Report dated Aug. 8, 2019 in related/corresponding DE Application No. 10 2018 133 196.7.

*Primary Examiner* — Allen C Wong
(74) *Attorney, Agent, or Firm* — Patent Portfolio Builders PLLC

(57) ABSTRACT

A computer-implemented method for ascertaining a need for predictive maintenance for a microscope system. A microscope system, which an image sensor for recording digital images of a sample, recording digital images during regular operation of the microscope system, and providing a digital image as an input data set to an image analysis system, is provided. At least one feature relating to a malfunction of the microscope system during regular operation is determined, a status signal is produced, and a component group of the microscope system for which a maintenance procedure is necessary is determined.

18 Claims, 5 Drawing Sheets

(56) References Cited

U.S. PATENT DOCUMENTS

2016/0307645 A1* 10/2016 Kim .................. G11C 29/4401
2019/0289078 A1* 9/2019 Watanabe ............. H04L 67/125

FOREIGN PATENT DOCUMENTS

DE     102013224373 A1     6/2014
DE     102016214080 A1     2/2017

* cited by examiner

IMAGE-BASED MAINTENANCE PREDICTION AND DETECTION OF OPERATING ERRORS

CROSS-REFERENCE TO RELATED APPLICATIONS

This application claims priority under 35 USC § 119 to German patent application DE 10 2018 133 196.7, filed Dec. 20, 2018, the entire disclosure of which is herein expressly incorporated by reference.

FIELD OF THE INVENTION

Exemplary embodiments of the invention generally relate to a system for a prediction of a need for maintenance procedures and in particular to a computer-implemented method for forward-looking maintenance for a microscope system, to a corresponding maintenance monitoring system and to a computer program product.

BACKGROUND

Modern technical devices frequently require complicated and time-intensive maintenance procedures in accordance with a specified maintenance plan. The maintenance plan utilizes past experience to determine the maintenance intervals in a manner such that the technical devices do not fail due to a lack of maintenance work. This situation gives rise to the fact that maintenance procedures are in fact performed more often than is necessary for some of the technical devices. This is particularly true if the devices are treated with care in the manner that is appropriate for the system by high-quality staff. This does not only apply to pilots, which are sometimes even paid extra for treating engines gently (very rarely at full load), but also to high-precision instruments such as highly complex precision microscope systems. The systems are used, for example, in the medical, biomedical or material-science fields; even here it is important that the system downtimes due to maintenance work are kept as short as possible to permit the fastest possible amortization of the investments in the devices.

Operating errors can result in reduced maintenance cycles or even unexpected maintenance. Modern maintenance approaches therefore take the actual use of a system into account, wherein in some cases digital twins of the systems are already kept—in particular by the manufacturers of the systems—in order to dynamically determine maintenance cycles. However, this would require a constant electronic connection (Internet) between the microscope system and the manufacturer. For reasons of data protection and other reasons, such coupling is frequently not desirable. In addition, this type of constant monitoring would require that the microscope systems are equipped with a multiplicity of additional sensors that permit exact capturing of the handling and use of the microscope systems. However, equipping the microscope systems with additional sensors would entail significant additional costs for making manufacturer-recommended dynamic maintenance cycles within the meaning of forward-looking maintenance (predictive maintenance) possible. The concept of predictive maintenance involves performing maintenance work only where it is probably actually necessary. To make this dynamic predictive maintenance possible, it is typically necessary to obtain data relating to the use of the systems, as would be provided by additional sensors within the microscope systems. As already illustrated, this results in additional and not insignificant technical outlay and considerable additional costs.

Exemplary embodiment of the invention are therefore directed to making predictive maintenance possible without the need for complicated additional internal sensors in the microscope system and/or additional network connections for the concept of a digital twin.

SUMMARY OF THE INVENTION

Exemplary embodiments of the invention are directed to a computer-implemented method for identifying a need for predictive maintenance for a microscope system, a corresponding maintenance monitoring system for predictive maintenance for a microscope system and a computer program product in accordance with the independent claims. Further configurations are described by the respectively dependent claims.

According to one aspect of the present invention, a computer-implemented method for determining a need for predictive maintenance for a microscope system is provided. The method includes providing a microscope system comprising an image sensor for recording digital images of a sample, and recording digital images using the image sensor during regular operation of the microscope system.

A recorded digital image is made available as at least one input data set to an image analysis system. Based thereon, at least one feature is determined by the image analysis system in the at least one recorded digital image, wherein the feature correlates to a malfunction of the microscope system during regular operation.

The method furthermore comprises producing a status signal for a state of the microscope system by way of the image analysis system based on the at least one digital image and the at least one feature that is contained therein, and determining—by using the status signal—a component group of the microscope system that requires a maintenance procedure.

According to a different aspect of the present invention, a maintenance monitoring system for determining a need for predictive maintenance for a microscope system is introduced. The maintenance monitoring system comprises a microscope system having an image sensor for recording digital images of a sample, and an image sensor for recording digital images during regular operation of the microscope system.

The maintenance monitoring system furthermore comprises an image analysis system, which is adapted for receiving at least one recorded digital image as at least one input data set for an image analysis system. The image analysis system is here adapted for determining at least one feature by way of the image analysis system in the at least one recorded digital image, wherein the feature correlates to a malfunction of the microscope system during regular operation. The maintenance monitoring system furthermore includes producing a status signal for a state of the microscope system by way of the image analysis system based on the at least one digital image and the at least one feature that is contained therein, and determining—by using the status signal—a component group of the microscope system that requires a maintenance procedure.

Furthermore, it is possible for embodiments to be implemented in the form of a corresponding computer program product, which can be accessed using a computer-usable or computer-readable medium which has program code for use by, or in conjunction with, a computer or instruction execution system. In the context of this description, a computer-usable or computer-readable medium can be any apparatus that includes means for storing, communicating, transmitting or transporting the program for use by, or in conjunction with, an instruction execution system, a corresponding apparatus or equipment.

The computer-implemented method for ascertaining predictive maintenance for a microscope system exhibits a plurality of advantages and technical effects:

Exemplary embodiments permit the performance of the principle of predictive maintenance without taking the consequential path of the Internet of Things (industry 4.0), that is to say without equipping the microscope systems with additional complex internal sensors. The proposed concept does not require any additional costly capturing and gathering of temperature data, voltage values and/or usage data directly at the components of the microscope system that are to be monitored.

Rather, exemplary embodiments are based on an evaluation and usage of data that are produced at any rate during normal operation and normal usage of the microscope system. In addition, it is no longer necessary to record additional (reference) images. The analysis for determining the need of a predictive maintenance procedure is instead based on the images that a user records during normal use of the device, for example in experiments. Additional maintenance or calibration recordings are not necessary.

Moreover, recording and evaluations of the images recorded during normal operation in time series permits relatively long-term analysis of the usage behavior, as a result of which it is in turn possible to infer defects of the microscope system which already exist or may occur in future.

A comparison between a plurality of microscope systems (possibly of the same model range/the same type) can also contribute to an even more precise prediction of a need for maintenance.

Accordingly, exemplary embodiments permit a state determination and identification of existing errors on the system—for example a defective component, misalignment, etc.—an estimate relating to errors occurring in the future—including a time horizon—and an analysis of causes—for example a differentiation between errors due to a device, the sample and usage.

Most disadvantages of prior methods for improving the maintenance of microscope systems can be overcome by the exemplary embodiments: (a) additionally required sensors frequently cannot be retrofitted for technical or cost reasons, (b) deriving the state of the device from individual measurement parameter values of individual sensors on individual components of the microscope system frequently does not permit an overall assessment of the state of the microscope system or require a highly complex set of rules and a large number of sensors and corresponding measurement values. Nevertheless, these are frequently not representative for assessing the overall state of a microscope system.

By contrast, it is possible with the exemplary embodiments to compensate errors caused by the user by adapting recording parameters of the microscope system to achieve the full performance of the microscope system. It is additionally possible to compensate when assessing the device state usage by different operators of the microscope system for which the additional internal sensors would provide different measurement values.

The use of technologies of artificial intelligence, image recognition and machine learning now permits evaluation of the results of the microscope system, specifically of one or more recorded images during regular operation of the microscope system, in order to draw conclusions relating to the entire microscope system, or the individual components thereof, from the assessment of the images and the "experience" from previously recorded images having known system errors using a trained neural network, as an example of an image analysis system.

No reference samples, reference patterns or reference settings are required herefor. Normal operation of the microscope system is sufficient to permit continuous assessment/evaluation of the overall state of the microscope system so as to ascertain, suggest and plan preventive maintenance procedures to keep downtimes of the microscope system as short as possible, resulting in a maximum of satisfaction for users and/or customers.

The advantage is substantially that necessary or recommended maintenance procedures do not need to be supplemented and extended by additional apparatuses and/or extensions—in particular mechanical, electromechanical and/or electronic sensors—but that components of the microscope system that are already present are used to determine a need for predictive maintenance procedures. Consequently, the complexity of the microscope system is not increased, which means that no additional maintenance procedures are required for the unnecessary extensions. Rather, the subsystems that are already present are used and—according to the method—are used better during proper, routine, regular operation of the microscope system, in particular on account of improved evaluations of the recorded digital images that are already recorded during regular operation. A correspondingly adapted image analysis system forms the basis for this solution.

In summary, it can be stated that the recorded images permit a significant improvement of utilization periods of microscope systems on account of the dual utilization—that is to say the evaluation of the images that are already obtained during the regular operation of the microscope system with respect to necessary maintenance procedures.

Further exemplary embodiments of the inventive concept of the method, which can similarly apply accordingly to the corresponding maintenance monitoring system, will be introduced below.

According to one advantageous exemplary embodiment of the method, the image analysis system may comprise a learning system having properties of machine learning. The method may here additionally comprise training the learning system using a set of digital images by way of machine learning for generating a learning model for identifying the at least one feature—such as anomalies or other peculiarities—in one of the recorded digital images of samples during regular operation of the microscope system. The learning system may be, for example, a system for supervised learning, for example a deep neural network (DNN) or another suitable system for artificial intelligence or machine learning. The images of the set of digital images for supervised learning for generating the learning model can additionally be annotated with metadata, that is to say the respective images of the set of digital images for supervised learning are supplemented by metadata that describe, for example, anomalies or other peculiarities and features in the training images. It is additionally possible to supplement proposed maintenance procedures on the basis of the peculiarities, anomalies and features in the images in the metadata.

According to one supplementary exemplary embodiment of the method, it is accordingly possible for the metadata to comprise at least one of the following group: a time interval value in which the maintenance procedure is necessary, an expected time of failure of a component of the microscope system, a numerical state indication—for example assessment stages 1 to 10—of an individual component (or group) of the microscope system, and naming of a defective component of the microscope system. In this way, the learning system is trained by the method to determine, based on specific features of the recorded images, maintenance procedures on individual components or component groups of the microscope system that become necessary during regular operation of the microscope system.

According to a further supplementary exemplary embodiment of the method, the determination of the component group of the microscope system may additionally comprise determining a time interval value in which the maintenance procedure is necessary. In this way, future maintenance procedures may be dynamically stored in a maintenance plan. Maintenance procedures of the same type or maintenance procedures on microscope systems at different locations may in this way be better coordinated by the maintenance staff.

According to an extended exemplary embodiment of the method, when producing the status signal by way of the image analysis system, at least one further captured sensor value—in particular not from the image sensor—of the microscope system can be captured, which will be used as additional input data for the learning system. It is useful here to also take such sensor measurement values into account when training the learning system. It may be useful in this respect to also correspondingly annotate the input data sets of the additional sensor values that are additionally made available to the learning system, with the result that maintenance procedures can be derived from a combination of the sensor values together with the analyzed recorded images during regular operation. As an example of such additional sensor measurement values, it is possible to evaluate intensity values of the illumination—either passively, i.e., using a sensor, or actively, i.e., for example measured using the current flow through the light-emitting means.

According to a further advantageous exemplary embodiment of the method, the at least one feature contained in the at least one recorded digital image during regular operation comprises at least one of the following group: stripes, jitters, irregular brightness—for example due to uneven field lighting—reduced resolution, excess image noise—for example derived from one or more specified or dynamically ascertained limit values—low signal-to-background ratio, low laser output, reduced sensitivity and imperfections in the digital image. In principle, this can involve all capturable and performable parameters of a digital image.

According to one possible embodiment of the method, the learning model may be generated for an individual microscope system or for a plurality of microscope systems. In this way, the learning model can be used, for example, for all microscope systems of a model range belonging to one microscope series without the need to repeat the training in each case.

In accordance with a supplementary embodiment of the method, it is possible during regular operation of the microscope system to measure at least one operating parameter value—ideally as a time series—of an operating element—as a result of which a user behavior is captured—that is additionally used in the determination of the status signal or influences it. It is possible here to determine that manual readjustments are continually being performed at individual actuators of the microscope system during regular operation that deviate from normal operation of the microscope system in terms of the number thereof and the time distances between them and to this extent are identified as anomalies or peculiar features produced by sensor measurement values during proper normal operation.

Such additional capturing of typical operating behavior of a user with respect to the microscope system could here fall into the scope of unsupervised learning and training of the learning system. To this end, the learning system is adapted to identify peculiarities and anomalies in the captured stated time series of measured parameter values of individual operating elements.

According to a further developed exemplary embodiment of the method, it is possible in the learning model for identifying the at least one feature for at least one category to be affected, which is selected from the group comprising: classifying service stages of the microscope system, regression to expected time of failure of the microscope system, correlation of the at least one feature or a combination of a plurality of features of the digital image with determination of a maintenance requirement of an assignable component or component group of the microscope system. In this way, it is easily possible to create detailed maintenance plans which are easy to plan by the maintenance staff.

According to an expanded exemplary embodiment of the method, the status signal can be generated from a combination of control signals. Here, one of the control signals can in each case refer at least to one of the following: an error source in the microscope system, a confidence factor of the signal of the error source, a type of error—in particular defect or wear—a number equivalent (for example a percentage) of a loss in quality, a necessary maintenance procedure, a time interval for a recommended or necessary maintenance procedure, an indication of the component for which the maintenance procedure is necessary or becomes necessary, information—in particular a recommendation—relating to alternative microscope system settings to at least partially compensate a malfunction of a component, information relating to an error source of positioning or incorrect preparation of the sample, and the like. In principle, all components and possible settings—and in particular the components that are subject to regular maintenance—are capturable in this way.

According to an additional expanded exemplary embodiment of the method, the states signal may be determined by the learning system by way of a comparison with time series, captured during regular operation, of a combination of sensor parameters of operating elements of the microscope system to expected values of the combination of sensor parameters of operating elements of the microscope system providing a significant deviation—for example greater than a dynamically ascertained threshold value. Such time series may also be used by way of the learning system—in particular by unsupervised learning during regular operation of the microscope system—for an assessment of the sensor parameters, a determination of deviations and a determination or recommendation of maintenance procedures or maintenance time points. The deviation(s) to be determined of values in the normal range (positive examples) can be determined by systems and/or technology such as autoencoder, one-class classification and novelty detection.

According to a further possible exemplary embodiment of the method, the determination of at least one feature by way of the image analysis system may be determined by detecting, in a sequence of recorded images of the microscope system during regular operation, a repeating feature which has a gradient or fluctuations or abrupt, irregular deviations in the chronically arranged sequence of recorded images or which (incorrectly) appears identically in each image, with the result that a systematic deviation from normal values or anomalies become(s) identifiable.

In this case, the determination of a normal value—or a plurality thereof—by way of unsupervised learning can be effected before an actual use of the microscope system or alternatively during the regular operation of the microscope.

The determined gradient can either have a positive or negative value. For example, in the case of a laser that becomes weaker over time, a negative gradient of the illumination values would be obtained. In this way, even creeping deterioration that is normally not immediately apparent to an average user of the microscope system is seamlessly capturable. What was said for the laser correspondingly also applies to other sensor values and also to features in the recorded digital images. Systematic errors that are not normally apparent to a human user would also be capturable thereby, such as for example individual defective pixels of the image sensor, a stop that is positioned in a slightly oblique manner, and the like.

One example of fluctuations that occur could be that a control unit for the main image sensor of the microscope system no longer functions as it should and, as a result, fluctuation-type irregularities in the recorded digital images may occur over time.

One example of an abrupt behavior could be a defective illumination means with a loose connection, as a result of which the intensity of the illumination of the samples varies—possibly without the human eye even detecting it.

According to a further extended possible exemplary embodiment of the method, the sequence of recorded images of the microscope system during regular operation could be a selected subset from a totality of recorded images of the microscope system during regular operation. In this way, various filters can be used for the selection. It would be conceivable in each case to use one image per day, images of the last few days or images that relate to a specific image content or a specific application, for example recorded specific other elements from cells such as whole cells, nuclei, cell walls etc.

The recorded images could also be selected according to metadata of the recorded images that were also stored; the metadata of each recording could comprise for example: time/date, user identification of the respective operator, dyes used for the samples, sample type, type and number of the color channels used, setting parameters of the optical path, experiment class (or a complete data set in this respect), general experiment data (using full-text search), etc.

According to an advantageous exemplary embodiment of the method, the learning system may be a neural network—or for example a support vector machine. The neural network may be trained using supervised learning or unsupervised learning. Learning then permits classification, detection and/or regression (for example for calculating a future maintenance time point in advance). With respect to the classifying operation, multi-class algorithms or one-class algorithms can be used. The neural network can be embodied as a deep neural network, as a CNN (convolutional NN) or an RNN (recursive NN).

In the case of unsupervised learning, algorithms such as deep autoencoder, one-class classification, multi-class classification or novelty detection may be used. In principle, it is possible to use any learning system that permits detection and determination of anomalies and trained features in the recorded digital images during regular operation.

BRIEF DESCRIPTION OF THE DRAWING FIGURES

It should be noted that the exemplary embodiments of the invention can be described with respect to different implementation categories. In particular, some exemplary embodiments are described with respect to a method, while other exemplary embodiments may be described in the context of corresponding apparatuses. Notwithstanding the above, it is possible for a person skilled in the art to identify and combine possible combinations of the features of the method and possible feature combinations with the corresponding system from the prior and subsequent description—unless otherwise noted—even if they belong to different claim categories.

Aspects that have already been described above and additional aspects of the present invention are evident, inter alia, from the exemplary embodiments described and from the additional further concrete configurations described with respect to the figures.

Preferred exemplary embodiments of the present invention will be described by way of example and with respect to the following figures.

DETAILED DESCRIPTION

Figure 1:
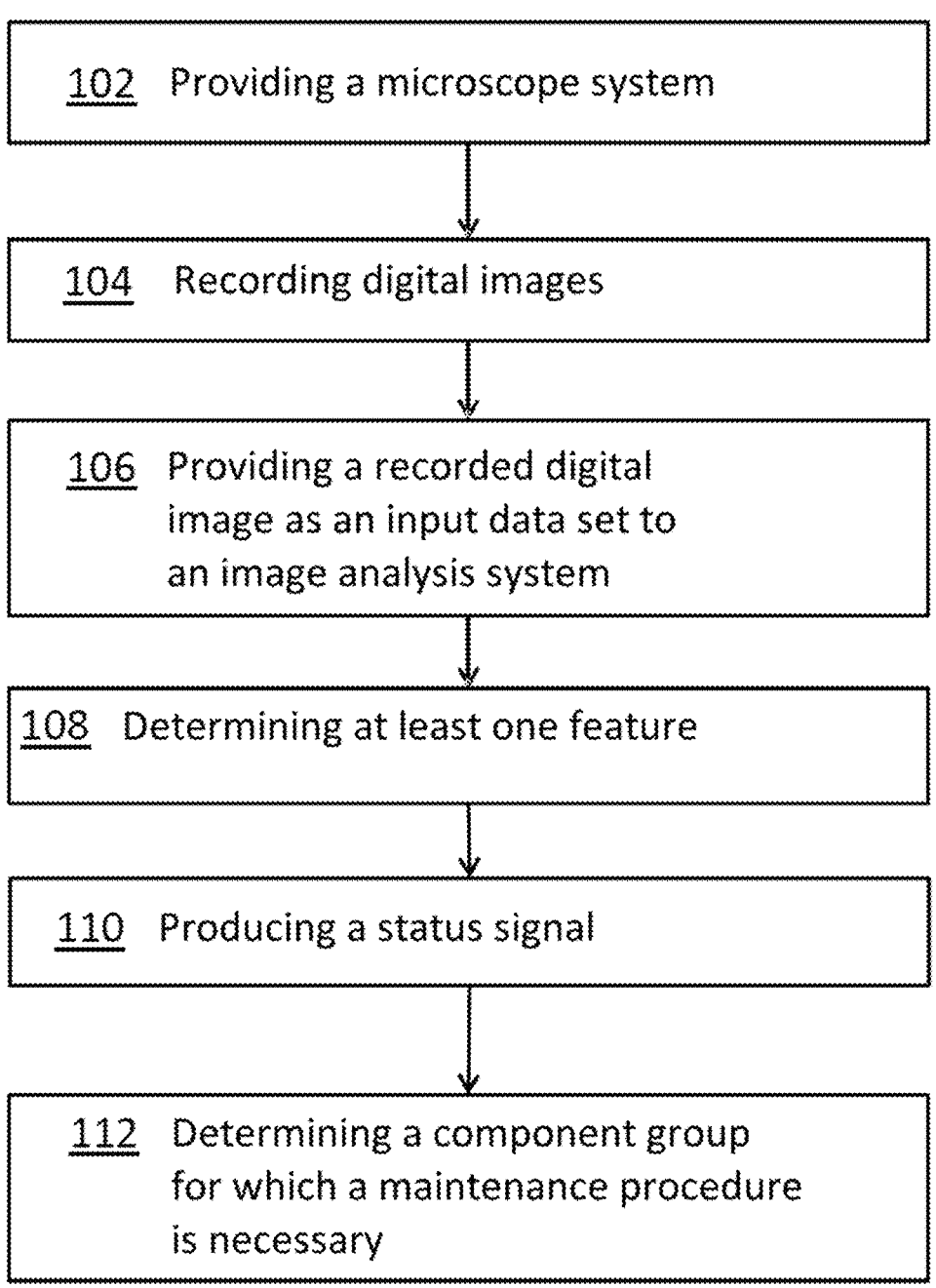
FIG. 1 is a block diagram of an exemplary embodiment of the inventive computer-implemented method for ascertaining a need for a maintenance procedure for a microscope system.

In the context of this description, conventions, terms and/or expressions should be understood in the following way:

The term "predictive maintenance"—occasionally also preventive service—in the context of this document describes how maintenance procedures can be optimized by performing only the procedures that are required at a specific time point in accordance with the state of the device—in the present case the microscope system. In this case, no fixed schedule is followed, but the determined state of the microscope system is used to dynamically determine that a maintenance procedure is recommended to prevent failure of the microscope system. The decision data for deriving a corresponding signal for a warning relating to necessary maintenance of a component group or an individual component are obtained from the ongoing operation or the ongoing use of the microscope system. Additional maintenance procedures or specific settings are not necessary. In this way, at least the following results can be attained: (i) few equipment downtimes within a utilization time, (ii) short service times, and (iii) minor effects of downtimes on the utilization times of the microscope system. In addition, the replacement parts supply can be optimized, since it is only necessary to stock a smaller number of replacement and wearing parts.

The term "maintenance procedure" relates here to any procedure of care, repair, adjustment or calibration, as a result of which the utilization of the microscope system is continually ensured, and downtimes are minimized. Due to the permanent observation (evaluation of the recorded images) during the use of the microscope system, even creeping deterioration is seamlessly capturable.

The term "microscope system" describes an optical or an optical/electronic system for magnifying and presenting small structures. Typically, the small structures that are captured by one or alternatively a plurality of objectives are captured using an image sensor, as a result of which the recorded images can be electronically and digitally processed further. Samples to be examined are typically displayed on a screen or in an eyepiece in magnified fashion. A modern high-performance microscope system also includes further components that tend to be of a mechanical nature and occasionally require maintenance procedures. This can include a sample stage, which can be displaceable in all three spatial directions, stops, a stand for holding the sample stage, one or more illumination systems, a plurality of manual and/or automated operating and setting elements, etc.

The term "image sensor" describes a photosensitive electronic semiconductor component which, in microscope systems, can frequently take the form of an area sensor in which the recorded images are directly converted into pixel information.

The term "sample" describes an object that is to be examined, for example on a sample carrier, such as a multiwell plate.

The term "regular operation" describes the daily or regular use of the microscope system by one or more users—or in automated method—to directly produce useful data in the form of digital images of samples that are to be examined. Regular operation does not comprise separate additional recordings of digital images that are made exclusively for maintenance purposes or other calibration purposes. Rather, the recorded digital images of the regular, daily operation are used to derive corresponding maintenance procedures therefrom.

The term "image analysis system" describes a system—frequently acting together with corresponding software—which in very general terms is suitable for generating metadata from the pixel information of recorded images. The metadata can be based on a classification of the pixels for segmenting image subregions, or regression techniques can be used for example to extrapolate a value. It is also possible here to use techniques of machine learning.

The term "learning system" describes a hardware-supported or software system from the field of artificial intelligence, which is adapted for learning from examples so as to associate—without procedurally specified and manually produced program instructions—for example contents of images or the partial regions thereof with abstract terms—such as "good" or "poor" or meaning constructs—for example segmentation of image contents. In general terms, mapping of input data to output data is learned.

The term "training of the learning system" means that for example a machine learning system adjusts, by way of a plurality of exemplary images, parameters in, for example, a neural network by partially repeated evaluation of the exemplary images so as to associate after the training phase even unknown images with one or more categories with which the learning system has been trained. The exemplary images are typically annotated—that is to say provided with metadata—in order to provide desired results, such as notifications relating to maintenance procedures that are to be performed, based on the input images.

In addition, it is possible, for example using a regression method, to predict a time point for a necessary or recommended maintenance procedure or an expected time of failure.

The term "machine learning" is a fundamental term of artificial intelligence, wherein, for example, statistical methods are used to give computer systems the ability to "learn". For example, specific behavior patterns within a specific scope of tasks is optimized. The methods used enable the systems of machine learning to analyze data without the need for any explicit procedural programming. Typically, CNN (convolutional neural network) is one example of a system for machine learning, a network of nodes, which act as artificial neurons, and artificial connections between the artificial neurons—also known as links, wherein for example parameters—for example weighting parameters for the connection—can be associated with the artificial connections. During the training of the neural network, weighting parameters of the connections automatically adapt based on input signals for producing a desired result. In the case of supervised learning, the images provided as input values are supplemented by metadata (annotations) in order to indicate a desired output value. In the case of unsupervised learning, such annotations are not necessary.

In this connection, mention should also be made of recursive neural networks (RNN), which likewise represent a type of deep neural network, in which the weight adaptation is recursive such that a structured prediction relating to input data of variable magnitude can be produced. Typically, such RNNs are used for sequential input data. Exactly as in the case of CNNs, back propagation functions in addition to the predictive weight adaptation are used here. RNNs can also be used in image analysis.

The term "convolutional neural network" describes a class of artificial neural networks based on feed-forward techniques. They are frequently used for image analyses with images as input data. The main constituent part of convolutional neural networks are here convolution layers (hence the name), which permits efficient evaluation by way of parameter sharing.

It should also be noted that deep neural networks involve a plurality of layers of different function: for example, an input layer, an output layer, and one or more interposed layers for example for convolution operations, application of non-linear functions, dimensionality reduction, normalization functions, etc. The functions can be performed in software, or special hardware assemblies can perform the calculation of the respective function values. Moreover, combinations of hardware and software elements are known.

The term "deep autoencoder" designates an autoencoder system based on the principle of a DNN. It is here typically an objective when using autoencoders to learn a compressed representation (encoding) for a set of data and to also extract significant features. In this way, it can be used for dimensionality reduction and/or anomaly detection. The actual encoder layer is here located between the input layer of artificial neurons and the output layer.

The term "one-class classification" should also be identified in this context. Corresponding methods are also known as "unary classification" or "class modelling", which try to identify specific objects in a recorded digital image as a specific class amongst other objects. Training runs are also necessary herefor. In this way, anomalies in a series of digital images can be identified.

The term "novelty detection" describes a mechanism by which an "intelligent" system (for example an intelligent organism) can identify an incoming sensory pattern as being hitherto unknown. This principle can also be applied to artificial neural networks. If a sensory pattern arriving at the artificial neural network does not produce an output signal in which the identification probability lies above a specified (or dynamically adapted) threshold value, or produces a plurality of output signals in which the identification probabilities are of approximately the same size, the incoming sensory pattern—for example a digital image—can be classified as one having novel content (novelty).

If, on the other hand, a new exemplary image is supplied to a neural network that has been trained by way of known exemplary images (for example configured as an autoencoder) and runs through the autoencoder, the latter should be able to reconstruct the new exemplary image at the output. This is possible because the new exemplary image, when running through the autoencoder, is greatly compressed to expand/reconstruct it again afterwards by way of the neural network. If the new input image (largely) corresponds to the expanded/reconstructed image, the new exemplary image corresponded to a known pattern or it exhibits a great similarity to the contents of the training image database. If there is a significant difference when comparing the new exemplary image with respect to the expanded/reconstructed image, that is to say if the reconstruction errors are significant, the exemplary image is a hitherto unknown distribution (image content). That is to say if a neural network cannot map the data distribution, an anomaly has occurred as compared to the known database, which is assumed to be the normal case.

A detailed description of the figures follows. It should be understood here that all details and instructions are illustrated schematically in the figures. A block diagram of an exemplary embodiment of the inventive computer-implemented method for ascertaining a need for predictive maintenance for a microscope system is presented first. Further exemplary embodiments and exemplary embodiments for the corresponding system will be described below.

FIG. 1 is a block diagram of an exemplary embodiment of the inventive computer-implemented method for ascertaining a need for a maintenance procedure for a microscope system. The method includes providing 102 a microscope system that includes an image sensor for recording digital images of a sample, recording 104 digital images using the image sensor during regular operation of the microscope system, and providing 106 at least one recorded digital image as at least one input data set to an image analysis system.

The method furthermore includes: determining 108 at least one feature by way of the image analysis system in the at least one recorded digital image, wherein the feature correlates to a malfunction of the microscope system during regular operation, producing 110 a status signal for a state of the microscope system by way of the image analysis system based on the at least one digital image and the at least one feature contained therein, and determining 112, using the status signal, a component group of the microscope system requiring a maintenance procedure. This necessary maintenance procedure, or the maintenance procedure that is to be performed, will be indicated to the user. This can be done by way of text or by way of a graphic, by presenting an image of the microscope system while specially marking the component that is to be maintained. It is additionally possible to output an indication relating to the type of maintenance procedure (for example cleaning the optical system, replacing the illumination etc.).

Figure 2:
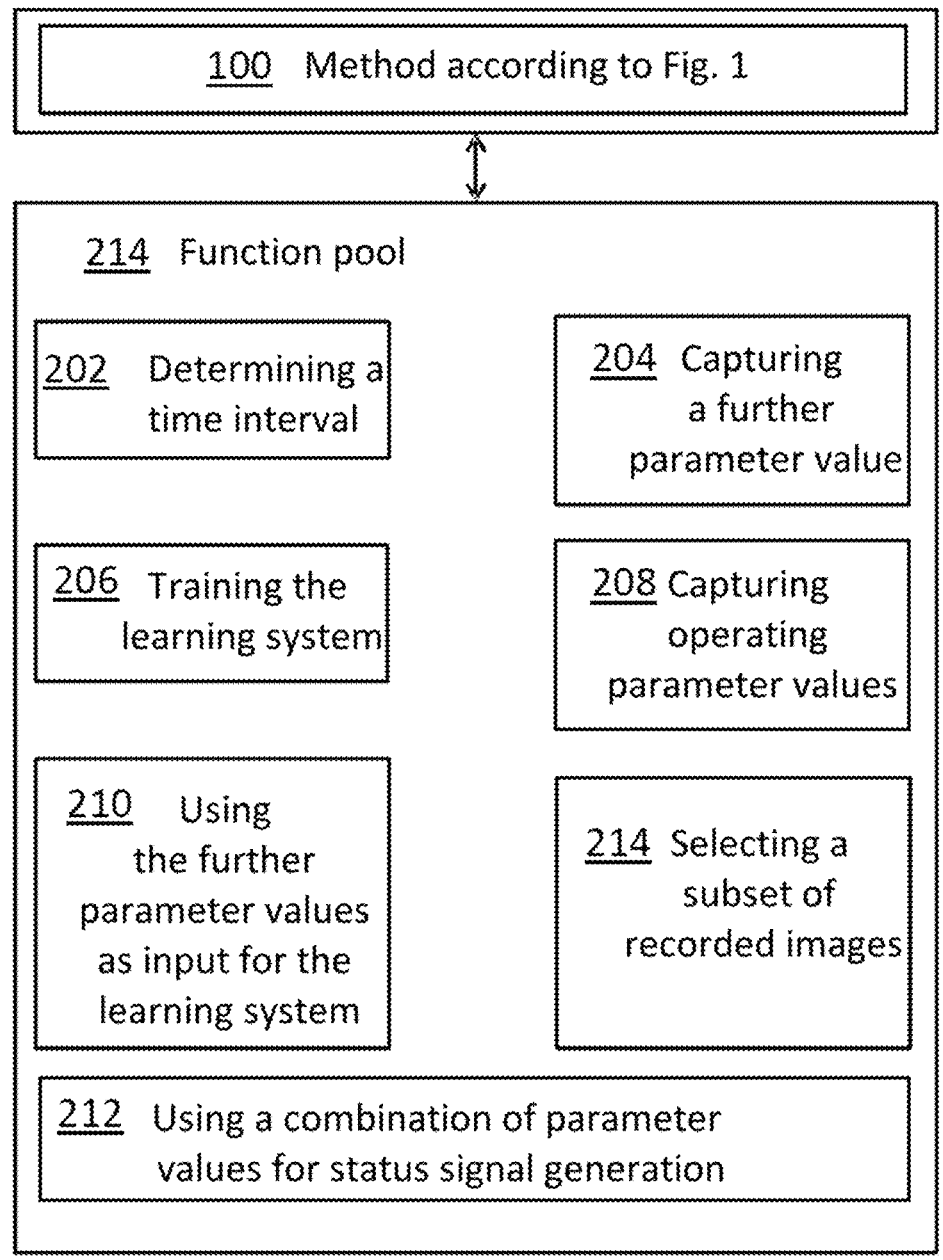
FIG. 2 is a block diagram of possible extensions of the computer-implemented method presented in FIG. 1.

FIG. 2 is a block diagram of possible extensions of the computer-implemented method presented in FIG. 1. For this purpose, a function pool 214 is available, from which additional functions can be integrated by request into the method 100 according to FIG. 1. This includes determining 202 a time interval for a necessary or recommended maintenance procedure at the microscope system, capturing 204 further parameter values of components of the microscope system, training 206 the learning system in a different form (supervised/unsupervised learning), capturing 208 parameter values of operating elements—possibly also in time-dependent fashion—using 210 a combination of parameter values for generating a status signal for an ascertained maintenance procedure for the microscope system, and using 212 the further parameter values as input data for the learning system. To this end, the further parameter values are made available—advantageously as a time series—to the learning system in the form of input data. In addition, the function "selection of a subset of the recorded images" is available in the function pool. The selection can be made according to the aforementioned selection parameters.

Figure 3:
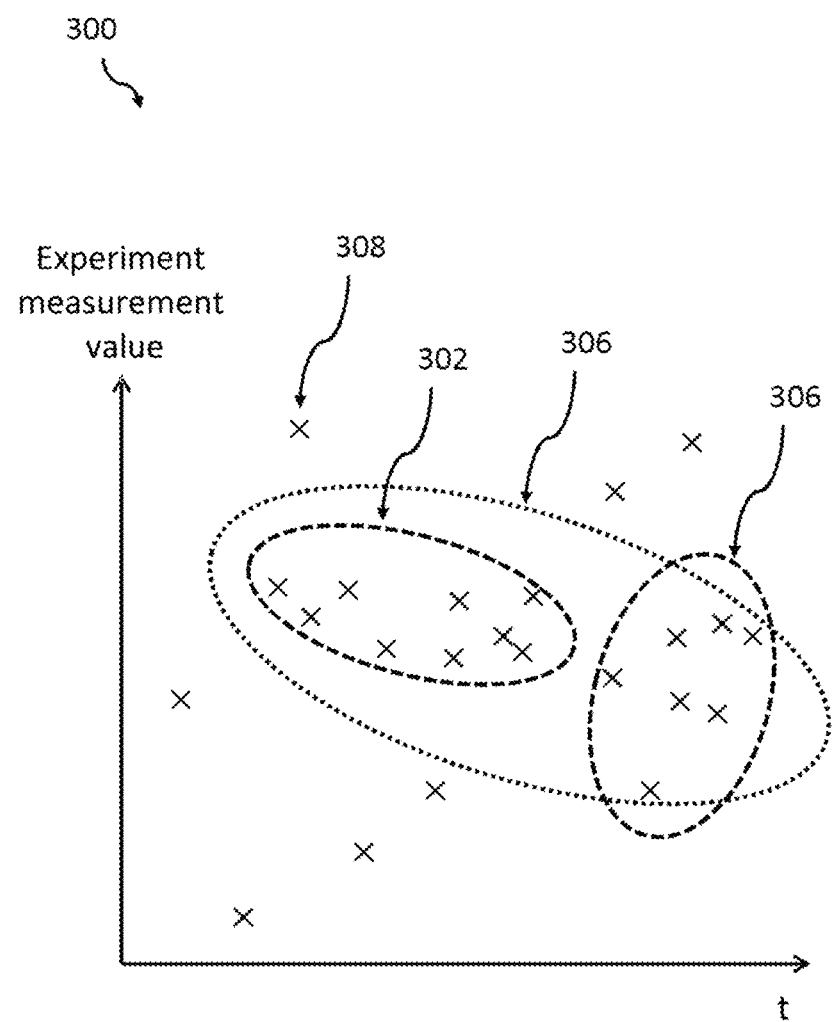
FIG. 3 illustrates an exemplary graph with images recorded for selection purposes.

FIG. 3 is an exemplary graph 300 with images recorded for selection purposes. The time at which the recorded images were produced, or at which the corresponding experiment was performed, is plotted on the x-axis (time/date combination). Experiment measurement values are plotted as an example on the y-axis. Each measurement point 308 represents one recorded image. The selection of the images can then be performed in accordance with various criteria (see above). Depending on the selection criteria, different groups 302, 306 and 308 of recorded images are obtained here, as is illustrated by the exemplary encirclements.

Figure 4:
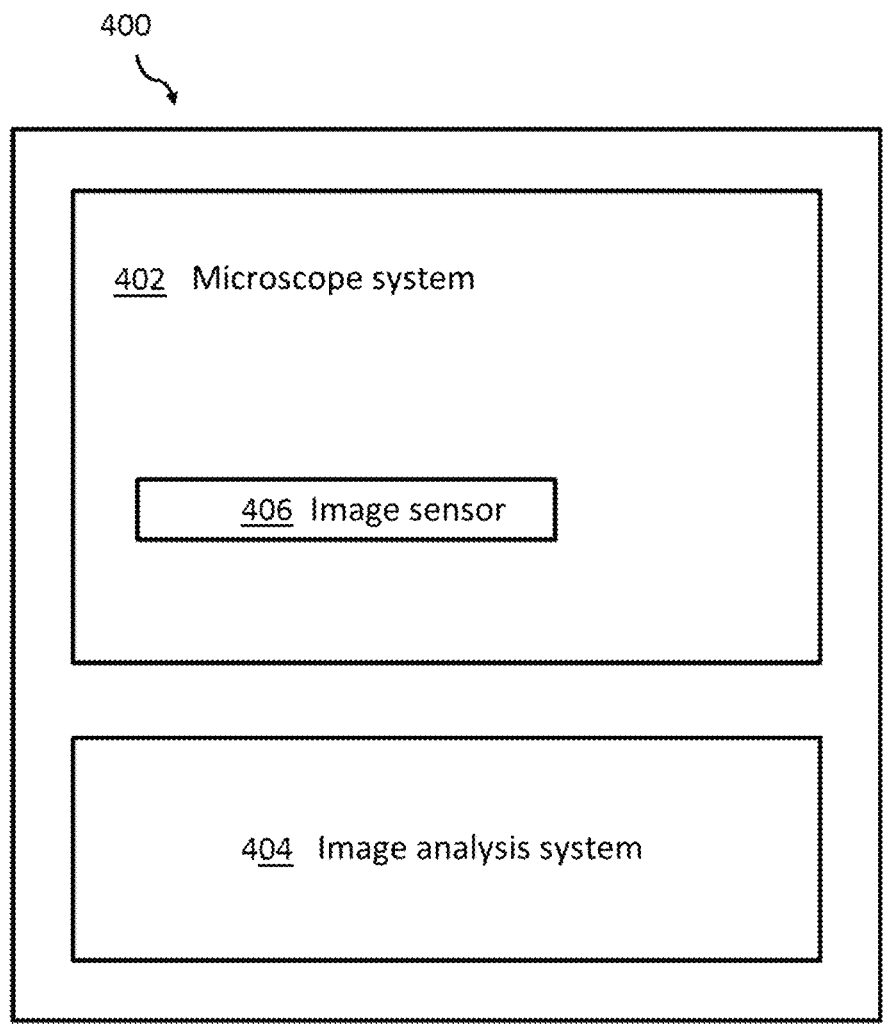
FIG. 4 is a block diagram of an exemplary embodiment of the maintenance monitoring system for ascertaining a need for a maintenance procedure for the microscope system.

FIG. 4 is a block diagram of an exemplary embodiment of the maintenance monitoring system 400 for ascertaining a need for a maintenance procedure for the microscope system. The maintenance monitoring system here includes: a microscope system 402 having an image sensor 406 for recording digital images of a sample, wherein the image sensor 406 is used for recording digital images during regular operation of the microscope system 402.

Moreover, the maintenance monitoring system includes an image analysis system 404, which is configured to receive at least one recorded digital image as at least one input data set. The image analysis system 404 is furthermore configured to determine at least one feature in the at least one recorded digital image, wherein the feature correlates to a malfunction of the microscope system during regular operation, producing a status signal for a state of the microscope system by way of the image analysis system based on the at least one digital image and the at least one feature contained therein, and determining by using the status signal a component group of the microscope system that requires a maintenance procedure.

Figure 5:
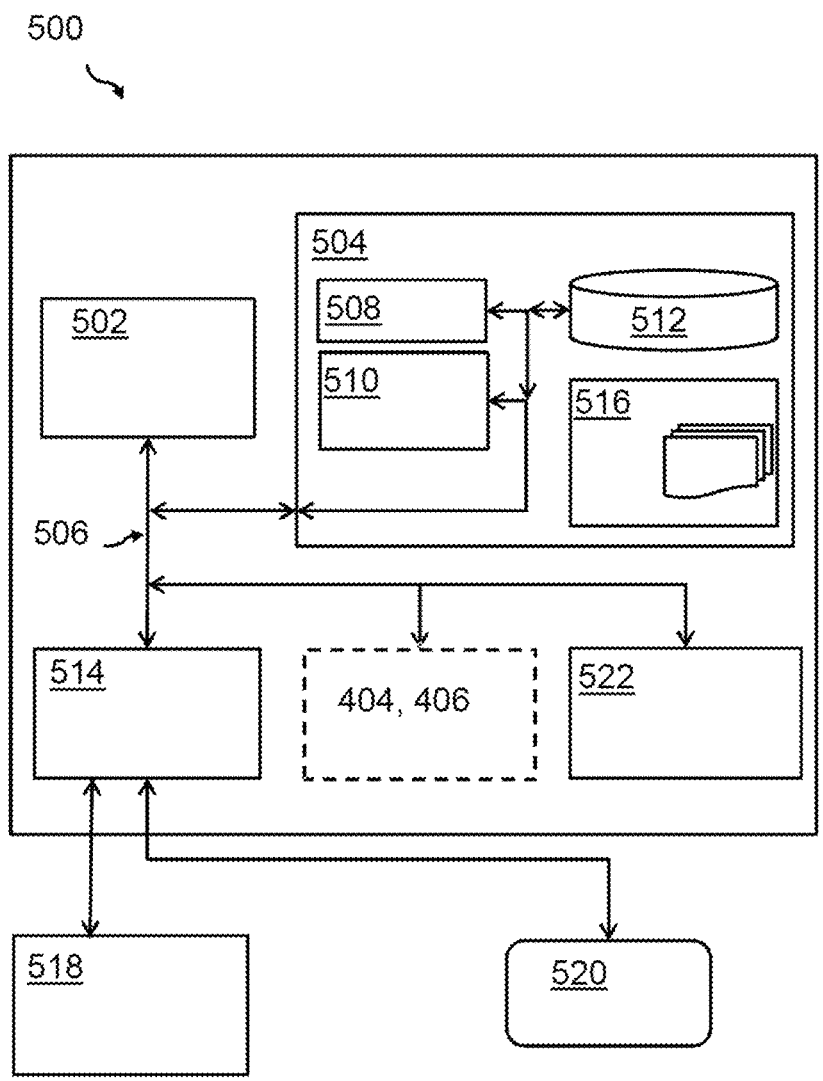
FIG. 5 is a block diagram of a computer system, which includes at least parts of the maintenance monitoring system.

FIG. 5 is a block diagram of a computer system, which can include at least parts of the maintenance monitoring system. The disclosed embodiments can be used in principle with practically any type of computer, irrespective of the platform used therein, for storing and/or executing program codes. FIG. 5 presents an example of a computer system 500, which is suitable for executing program code in accordance with the method that is introduced here. A computer system that is already present in the microscope system can also serve—possibly with appropriate extensions—as a computer system for performing the concept that is introduced here.

The computer system 500 includes a plurality of generally utilizable functions (general-purpose functions). The computer system can here be a tablet computer, a laptop/notebook computer, another portable or mobile electronic device, a microprocessor system, a microprocessor-based system, a smartphone or a computer system with specifically set-up functions. The computer system 500 can be set up for executing instructions that are able to be executed by the computer system—such as for example program modules—which can be executed to implement functions of the concepts which are proposed here. To this end, the program modules can have routines, programs, objects, components, logic, data structures etc. to implement specific tasks or specific abstract data types.

The components of the computer system can include the following: one or more processors or processing units 502, a storage system 504 and a bus system 506 that connects different system components including the storage system 504 and the processor 502. The computer system 400 typically includes a plurality of volatile or non-volatile storage media which are accessible by the computer system 400. Data and/or instructions (commands) of the storage media can be stored in the storage system 404 in a volatile form—such as in a RAM (random access memory) 408—so as to be executed by the processor 402. The data and instructions realize individual or a plurality of functions of the concept that has been introduced here. Further components of the storage system 504 can be a permanent memory (ROM) 510 and a long-term memory 512, in which the program modules and data (reference sign 516) can be stored.

The computer system has a series of dedicated apparatuses (keyboard 518, mouse/pointing device (not illustrated), screen 520 etc.) for communication purposes. These dedicated apparatuses can also be combined in a touch-sensitive display. A separately provided I/O controller 514 ensures seamless data exchange with external devices. A network adapter 522 is available for communication using a local or global network (LAN, WAN, for example the Internet). The network adapter can be accessed by other components of the computer system 500 by way of the bus system 506. It is to be understood here that—although this is not illustrated—other apparatuses can also be connected to the computer system 500.

Moreover, at least parts of the maintenance monitoring system 400 (cf. FIG. 3) can be connected to the bus system 506, such as the image sensor 406 and/or the image analysis system 404. The digital image data of the image sensor 406 can also be prepared by a separate pre-processing system (not illustrated).

The description of the various exemplary embodiments of the present invention was presented for the sake of providing better comprehension, but it does not serve for directly limiting the inventive concept to the exemplary embodiments. Further modifications and variations are apt to the person skilled in the art. The terminology used here was selected to best describe the principles of the exemplary embodiments and to make them easily accessible to the person skilled in the art.

The principle introduced here can be embodied both in the form of a system, a method, combinations thereof and/or a computer program product. The computer program product can in this case have a (or a plurality of) computer-readable storage medium/media having computer-readable program instructions to cause a processor or control system to perform various aspects of the present invention.

Suitable media used as transmission medium are electronic, magnetic, optical, electromagnetic, infrared media or semiconductor systems; for example, SSDs (solid state device/drive), RAM (random access memory) and/or ROM (read-only memory), EEPROM (electrically erasable ROM) or any desired combination thereof. Further transmission media are also propagating electromagnetic waves, electromagnetic waves in waveguides or other transmission media (for example light pulses in optical cables) or electrical signals transmitted in wires.

The computer-readable storage medium can be an embodied apparatus that holds or stores instructions for use by an instruction execution device. The computer-readable program instructions described here can also be downloaded to a corresponding computer system, for example as a (smartphone) app from a service provider via a cable connection or a mobile radio network.

The computer-readable program instructions for executing operations of the invention described here can be machine-dependent or machine-independent instructions, microcode, firmware, status-defining data or any source code or object code that is written for example in C++, Java or similar or in conventional procedural programming languages such as for example the programming language "C" or similar programming languages. The computer-readable program instructions can be executed completely by a computer system. In some exemplary embodiments, this may involve electronic circuits such as for example programmable logic circuits, field programmable gate arrays (FPGA) or programmable logic arrays (PLA) that execute the computer-readable program instructions by using status information of the computer-readable program instructions to configure or individualize the electronic circuits according to aspects of the present invention.

Moreover, the invention introduced here is illustrated with reference to flowcharts and/or block diagrams of methods, apparatuses (systems) and computer program products in accordance with exemplary embodiments of the invention. It should be noted that practically any block of the flowcharts and/or block diagrams can be realized as computer-readable program instructions.

The computer-readable program instructions can be made available to a general-purpose computer, a special computer or a data processing system that is otherwise programmable to create a machine such that the instructions that are executed by the processor or the computer or other programmable data processing apparatus create means for implementing the functions or processes that are illustrated in the flowchart and/or block diagrams. The computer-readable program instructions can also correspondingly be stored on a computer-readable storage medium.

In this context, any block in the illustrated flowchart or the block diagrams can represent a module, a segment or portions of instructions representing a plurality of executable instructions for implementing the specific logic function. In some exemplary embodiments, the functions illustrated in the individual blocks can be performed in a different order, possibly even in parallel.

The illustrated structures, materials, sequences and equivalents of all means and/or steps with associated functions in the following claims are intended to apply all structures, materials or sequences, as expressed by the claims.

REFERENCE SIGNS

100 Method
102 Method step

104 Method step
106 Method step
108 Method step
110 Method step
112 Method step
202, . . . 216 Method steps of possible extensions
300 Graph for selecting images
302, 304, 306 Possible selected groups of images
308 Example measurement value
400 Maintenance monitoring system
402 Microscope system
404 Image analysis system
406 Image sensor
500 Computer system
502 Processor
504 Memory system
506 Bus system
508 RAM
510 ROM
512 Long-term memory
514 I/O controller
516 Program modules and data
518 Keyboard
520 Screen
522 Network adapter

What is claimed is:

1. A computer-implemented method for determining a need for predictive maintenance for a microscope system, the method comprising:
providing a microscope system, which includes an image sensor configured to record digital images of a sample;
recording digital images using the image sensor during regular operation of the microscope system;
providing at least one recorded digital image of the recorded digital images as at least one input data set to an image analysis system;
determining, by the image analysis system, at least one feature in the at least one recorded digital image, wherein the feature correlates to a malfunction of the microscope system during regular operation;
producing, by the image analysis system, a status signal for a state of the microscope system based on the at least one recorded digital image and the at least one feature contained in the at least one recorded digital image; and
determining, using the status signal, a component group of the microscope system for which a maintenance procedure is necessary.

2. The method of claim 1, wherein the image analysis system is a learning system having properties of machine learning, the method further comprising:
training, by machine learning, the learning system using a set of digital images to generate a learning model for identifying the at least one feature in one of the recorded digital images of samples during regular operation of the microscope system.

3. The method of claim 2, wherein the learning system is a system for supervised learning and the images of the set of digital images for supervised learning are annotated with metadata for generating the learning model.

4. The method of claim 3, wherein the metadata is at least one selected from a group consisting of a time interval value in which the maintenance procedure is necessary, an expected time of failure of a component of the microscope system, a numerical state indication of an individual component of a microscope system, and naming of a defective component of the microscope system.

5. The method of claim 2, wherein at least one further captured sensor value of the microscope system is used as additional input data for the learning system for producing the status signal by the image analysis system.

6. The method of claim 2, wherein the learning model is generated for an individual microscope system or for a plurality of microscope systems.

7. The method of claim 2, wherein the learning model for identifying the at least one feature relates to at least one category, which is selected from the group consisting of: classification of service stages of the microscope system, regression to expected time of failure of the microscope system, correlation of the at least one feature or a combination of a plurality of features of the digital image with determination of a maintenance requirement of an assignable component or component group of the microscope system.

8. The method of claim 2, wherein the status signal is determined by the learning system by comparing a time series, captured during regular operation, of a combination of sensor parameters of operating elements of the microscope system to comparison values of the combination of sensor parameters of operating elements of the microscope system.

9. The method of claim 2, wherein the learning system is a neural network.

10. The method of claim 1, wherein the determining of the component group of the microscope system further comprises:
determining a time interval value in which the maintenance procedure is necessary.

11. The method of claim 1, wherein the at least one contained feature in the at least one recorded digital image during regular operation is at least one from a group consisting of stripes, jitters, irregular brightness, reduced resolution, excess image noise, low signal-to-background ratio, low laser output, reduced sensitivity and imperfections in the digital image.

12. The method of claim 1, wherein at least one operating parameter value, which is additionally used in the determination of the status signal, of an operating element of the microscope system is measured during regular operation of the microscope system.

13. The method of claim 1, wherein the status signal is generated from a combination of control signals, wherein in each case one of the control signals relates at least to one of the following: error source in the microscope system, confidence factor of the signal of the error source, type of an error, number value of a loss in quality, necessary maintenance procedure, time interval for a maintenance procedure, indication of the component for which a maintenance procedure is necessary, information relating to alternative microscope system settings to at least partially compensate a malfunction of a component, information relating to an error source of positioning or incorrect preparation of the sample.

14. The method of claim 1, wherein the determination of the at least one feature is performed by the image analysis system by:
detecting, in a sequence of recorded images of the microscope system during regular operation, a repeating feature, which has in the chronologically arranged sequence of recorded images, a gradient, fluctuations, an abrupt behavior, or appearing identically in each image.

15. The method of claim 14, wherein the sequence of recorded images of the microscope system during regular operation is a selected subset from a totality of recorded images of the microscope system during regular operation.

16. The method of claim 14, wherein the neural network is based on at least one of the following technologies: deep autoencoder, one-class classification, or novelty detection.

17. A maintenance monitoring system for predictive maintenance for a microscope system, the maintenance monitoring system comprising:
    a microscope system having an image sensor configured to record digital images of a sample, wherein the image sensor is used for recording digital images during regular operation of the microscope system; and
    an image analysis system configured to provide at least one recorded digital image of the recorded digital images as at least one input data set to the image analysis system, wherein the image analysis system is configured to
        determine at least one feature by the image analysis system in the at least one recorded digital image, wherein the feature correlates to a malfunction of the microscope system during regular operation,
        produce a status signal for a state of the microscope system based on the at least one recorded digital image and the at least one feature contained in the at least one recorded digital image, and
        determining, using the status signal, a component group of the microscope system for which a maintenance procedure is necessary.

18. A computer program product for determining a predictive maintenance for a microscope system having an image sensor for recording digital images of a sample, wherein the computer program product includes a non-transitory computer-readable storage medium, having program instructions which are stored thereon, wherein the program instructions, when executed by one or more computers or control units, cause the one or the plurality of computers or control units to:
    record digital images using the image sensor during regular operation of the microscope system;
    transmit, to an image analysis system, at least one recorded digital image of the recorded digital images as at least one input data set;
    determine, by the image analysis system, at least one feature in the at least one recorded digital image, wherein the feature correlates to a malfunction of the microscope system during regular operation;
    produce, by the image analysis system, a status signal for a state of the microscope system based on the at least one recorded digital image and the at least one feature contained in the at least one recorded digital image; and
    determine, using the status signal, a component group of the microscope system for which a maintenance procedure is necessary.

* * * * *